United States Patent
Lee et al.

(10) Patent No.: US 10,380,483 B2
(45) Date of Patent: Aug. 13, 2019

(54) METHOD AND APPARATUS FOR TRAINING LANGUAGE MODEL, AND METHOD AND APPARATUS FOR RECOGNIZING LANGUAGE

(71) Applicant: Samsung Electronics Co., Ltd., Suwon-si (KR)

(72) Inventors: Hodong Lee, Yongin-si (KR); Hoshik Lee, Yongin-si (KR); Heeyoul Choi, Hwaseong-si (KR); Yunhong Min, Seoul (KR); Sang Hyun Yoo, Seoul (KR); Yeha Lee, Hwaseong-si (KR); Jihyun Lee, Hwaseong-si (KR); YoungSang Choi, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 797 days.

(21) Appl. No.: 14/992,129

(22) Filed: Jan. 11, 2016

(65) Prior Publication Data
US 2016/0210551 A1    Jul. 21, 2016

(30) Foreign Application Priority Data
Jan. 19, 2015    (KR) .......................... 10-2015-0008881

(51) Int. Cl.
*G06N 3/04*    (2006.01)
*G06N 3/08*    (2006.01)
(Continued)

(52) U.S. Cl.
CPC .............. *G06N 3/08* (2013.01); *G06F 17/27* (2013.01); *G06N 3/04* (2013.01); *G06N 3/0445* (2013.01);
(Continued)

(58) Field of Classification Search
USPC .......................................................... 706/25
See application file for complete search history.

(56) References Cited

U.S. PATENT DOCUMENTS 9,781,240 B2 * 10/2017 Lee .................... H04M 1/6041
9,837,040 B2 * 12/2017 Moon .................. G09G 3/2092
(Continued)

FOREIGN PATENT DOCUMENTS

| JP | 2007-271876 A | 10/2007 |
|---|---|---|
| KR | 10-2004-0069060 A | 8/2004 |
| KR | 10-2008-0024911 A | 3/2008 |

OTHER PUBLICATIONS

Language Model: A Survey of the State-of-the-Art Technology AI Technology & Industry Review Author: Kejin Jin | Editor: Joni Chung | Localized by Synced Global Team: Xiang Chen Sep. 10, 2017 pp. 1-10.*

(Continued)

*Primary Examiner* — Michael B Holmes
(74) *Attorney, Agent, or Firm* — NSIP Law (57) ABSTRACT

A method and apparatus for training a language model, include generating a first training feature vector sequence and a second training feature vector sequence from training data. The method is configured to perform forward estimation of a neural network based on the first training feature vector sequence, and perform backward estimation of the neural network based on the second training feature vector sequence. The method is further configured to train a language model based on a result of the forward estimation and a result of the backward estimation.

21 Claims, 7 Drawing Sheets

(51) Int. Cl.
*G06F 17/27* (2006.01)
*G10L 15/00* (2013.01)
*G10L 15/16* (2006.01)
*G10L 15/19* (2013.01)

(52) U.S. Cl.
CPC .............. *G06N 3/084* (2013.01); *G10L 15/16* (2013.01); *G10L 15/19* (2013.01); *G10L 15/005* (2013.01)

(56) References Cited

U.S. PATENT DOCUMENTS

| | | | | |
|---|---|---|---|---|
| 9,875,255 | B2* | 1/2018 | Yoo | G06F 16/5838 |
| 9,940,933 | B2* | 4/2018 | Choi | G10L 15/183 |
| 9,953,647 | B2* | 4/2018 | Mun | G10L 15/22 |
| 9,961,294 | B2* | 5/2018 | Yoo | H04N 21/42203 |
| 9,996,271 | B2* | 6/2018 | Jung | G06F 3/061 |
| 10,043,520 | B2* | 8/2018 | Mun | G10L 15/32 |
| 10,067,939 | B2* | 9/2018 | Na | G06F 17/2809 |
| 10,108,853 | B2* | 10/2018 | Lee | G06K 9/00335 |
| 10,127,905 | B2* | 11/2018 | Lee | G10L 15/02 |
| 10,140,974 | B2* | 11/2018 | Hong | G10L 15/02 |
| 10,216,726 | B2* | 2/2019 | Lee | G06F 17/2836 |
| 2012/0150539 | A1 | 6/2012 | Jeon et al. | |
| 2012/0239397 | A1* | 9/2012 | Napper | G06F 17/30244 704/235 |
| 2013/0166279 | A1* | 6/2013 | Dines | G10L 15/02 704/8 |
| 2016/0210551 | A1* | 7/2016 | Lee | G06F 17/27 |
| 2017/0372696 | A1* | 12/2017 | Lee | G10L 15/02 |

OTHER PUBLICATIONS

Journal of Machine Learning Research 3 (2003) pp. 1137-1155 A Neural Probabilistic Language Model Yoshua Bengio, Réjean Ducharme, Pascal Vincent, Christian Jauvin.*

IEEE Deep Neural Networks for Acoustic Modeling in Speech Recognition: The Shared Views of Four Research Groups Hinton et al., IEEE Signal Processing Magazine ( vol. 29 , Issue: 6 , Nov. 2012) pp. 82-97.*

IEEE Speech recognition using neural networks with forward-backward probability generated targets Yonghong Yan Mark Fanty Ron Cole 997 IEEE International Conference on Acoustics, Speech, and Signal Processing pp. 3241-3244.*

IEEE Speech recognition with deep recurrent neural networks, Alex Graves; Abdel-rahman Mohamed; Geoffrey Hinton Published in: 2013 IEEE International Conference on Acoustics, Speech and Signal Processing 2013 IEEE.*

Sequence to Sequence Learning with Neural Networks, Advances inneural information Ilya Sutskever, Oriol Vinyals, Quoc V. Le pp. 1-8 2014.*

IEEE Hybrid speech recognition with Deep Bidirectional LSTM, Alex Graves; Navdeep Jaitly; Abdel-rahman Mohamed Published in: 2013 IEEE Workshop on Automatic Speech Recognition and Understanding 2013.*

ScienceDirect Elsevier Neural Networks vol. 18, Issues 5-6, Jul.-Aug. 2005, pp. 602-610 Framewise phoneme classification with bidirectional LSTM and other neural network architectures, Alex Graves, Jürgen Schmidhuber.*

Frinken, V. et al., "Long-Short Term Memory Neural Networks Language Modeling for Handwriting Recognition," IEEE 21$^{st}$ International Conference on Pattern Recognition (ICPR), 2012 (4 pages in English).

Graves, A. et al., "Speech recognition with deep recurrent neural networks," 2013 IEEE International Conference on Acoustics, Speech and Signal Processing (ICASSP), 2013 (5 pages in English).

Graves, A., "Supervised sequence labelling with recurrent neural networks," vol. 385, Heidelberg: Springer, 2012 (124 pages in English).

Office Action issued by the EPO dated Nov. 23, 2016 in corresponding EP Patent Application No. 15184200.2.

Morillot, Olivier, Laurence Likforman-Sulem, and Emmanuèle Grosicki. "Comparative study of HMM and BLSTM segmentation-free approaches for the regcognition of handwritten text-lines." Document Analysis and Recognition (ICDAR), 2013 12th International Conference on. IEEE, 2013.

Graves, Alex, Navdeep Jaitly, and Abdel-rahman Mohamed. "Hybrid speech recognition with deep bidirectional LSTM." Automatic Speech Recognition and Understanding (ASRU), 2013 IEEE Workshop on. IEEE, 2013.

Frinken, Volkmar, et al. "Bidirectional language model for handwriting recognition." Joint IAPR International Workshops on Statistical Techniques in Pattern Recognition (SPR) and Structural and Syntactic Pattern Recognition (SSPR). Springer Berlin Heidelberg, 2012.

Tam, Yik-Cheung, et al. "ASR error detection using recurrent neural network language model and complementary ASR." Acoustics, Speech and Signal Processing (ICASSP), 2014 IEEE International Conference on. IEEE, 2014.

Schuster, Mike, and Kuldip K. Paliwal. "Bidirectional recurrent neural networks." IEEE Transactions on Signal Processing 45.11 (1997): 2673-2681.

Sundermeyer, Martin, et al. "Translation Modeling with Bidirectional Recurrent Neural Networks." EMNLP. 2014.

* cited by examiner

METHOD AND APPARATUS FOR TRAINING LANGUAGE MODEL, AND METHOD AND APPARATUS FOR RECOGNIZING LANGUAGE

CROSS-REFERENCE TO RELATED APPLICATION(S)

This application claims the benefit under 35 USC 119(a) of Korean Patent Application No. 10-2015-0008881, filed on Jan. 19, 2015, in the Korean Intellectual Property Office, the entire disclosure of which is incorporated herein by reference for all purposes.

BACKGROUND

1. Field

The following description relates to a method and apparatus to train a language model, and a method and apparatus to recognize a language using the language model.

2. Description of Related Art

In the past, approaches to designing speech and language processing have moved from system and processes based on linguistics and speech science to data-driven pattern recognition techniques. These techniques have been the focus of intense, fast-moving research and have contributed to significant advances in this field. To classify a human input pattern, active research on applications of an efficient pattern recognition method of a human to an actual computer is being conducted. One such area of research is focused on an artificial neural network that models through mathematical expressions characteristics of biological nerve cells of a human.

The artificial neural network is used to output recognition results corresponding to an input pattern of a speech in a speech recognition field. The artificial neural network generates mapping between the input pattern and an output pattern through learning and outputs a learning result indicative thereof. Based on the learning result, the artificial neural network generates an output with respect to an input pattern yet to be used for learning.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with an embodiment, there is provided a method, including generating a first training feature vector sequence and a second training feature vector sequence from training data; performing forward estimation of a neural network based on the first training feature vector sequence, and performing backward estimation of the neural network based on the second training feature vector sequence; and training a language model based on a result of the forward estimation and a result of the backward estimation.

The neural network may include first hidden layers for the forward estimation and second hidden layers for the backward estimation, and the first hidden layers are separate from the second hidden layers.

The generating may include converting the training data into a word vector sequence; and generating the first training feature vector sequence starting in a forward direction of the word vector sequence and the second training feature vector sequence starting in a backward direction of the word vector sequence.

The forward estimation may include estimating a subsequent word to be connected to a first word included in the training data, and the backward estimation may include estimating a previous word connected to a second word included in the training data.

The training may include calculating an error value between the training data and output data of the neural network based on the result of the forward estimation and the result of the backward estimation; and updating a connection weight between artificial neurons included in the neural network based on the error value.

The language model may be configured based on a recurrent neural network of a bidirectional long short-term memory (BLSTM) structure.

The recurrent neural network of the BLSTM structure may include memory blocks configured to maintain a value output in a previous time period until a subsequent time period.

The training data may include sequential data including speech data, handwriting data, or a combination thereof.

In accordance with an embodiment, there is provided a method, including generating a first input feature vector sequence and a second input feature vector sequence from input data; and performing forward estimation of a neural network based on the first input feature vector sequence and performing backward estimation of the neural network based on the second input feature vector sequence to estimate a result of recognizing the input data.

The neural network may include first hidden layers for the forward estimation and second hidden layers for the backward estimation, and the first hidden layers may be separate from the second hidden layers.

The estimating may include estimating the result of recognizing the input data based on a forward estimation result associated with the first input feature vector sequence and a backward estimation result associated with the second input feature vector sequence.

A non-transitory computer-readable storage medium including a program including instructions may cause a computer to perform the method described above.

In accordance with another embodiment, there is provided an apparatus, including a training data preprocessor configured to generate a first training feature vector sequence and a second training feature vector sequence from training data; and a language model trainer configured to train a neural network based language model based on the first training feature vector sequence and the second training feature vector sequence, perform forward estimation of the neural network with respect to the first training feature vector sequence, and perform backward estimation of the neural network with respect to the second training feature vector sequence.

The neural network may include first hidden layers for the forward estimation and second hidden layers for the backward estimation, and the first hidden layers may be separate from the second hidden layers.

The language model trainer may be configured to train the language model based on a result of the forward estimation and a result of the backward estimation.

The language model trainer may be configured to calculate an error value between the training data and output data based on a result of the forward estimation and a result of the backward estimation, and update a connection weight between artificial neurons included in the neural network based on the error value.

The training data preprocessor may be configured to convert the training data into a word vector sequence, and generate the first training feature vector sequence starting in a forward direction of the word vector sequence and the second training feature vector sequence starting in a backward direction of the word vector sequence.

In accordance with another embodiment, there is provided an apparatus for recognizing a language, the apparatus including an input data preprocessor configured to generate a first input feature vector sequence and a second input feature vector sequence from input data; and an input data recognizer configured to perform forward estimation of a neural network based on the first input feature vector sequence, and perform backward estimation of the neural network based on the second input feature vector sequence to estimate a result of recognizing the input data.

In accordance with another embodiment, there is provided an apparatus for recognizing a language, the apparatus includes an input data preprocessor configured to generate a first input feature vector sequence and a second input feature vector sequence from input data; and an input data recognizer configured to perform forward estimation using the first input feature vector sequence based on first hidden layers of a neural network, and perform backward estimation using the second input feature vector sequence based on second hidden layers of the neural network, wherein the first hidden layers are separate from the second hidden layers.

The apparatus may also include a language model database configured to store a neural network based language model.

In accordance with another embodiment, there is provided a language model trainer apparatus, including a training processor configured to train a language model based on a first training feature vector sequence and a second training feature vector sequence; a controller configured to perform forward estimation of a neural network based on the first training feature vector sequence, and perform backward estimation of the neural network based on the second training feature vector sequence; and an error calculating processor configured to calculate an error value between training data and output data of the language model by integrating a result of the forward estimation with respect to the first training feature vector sequence and a result of the backward estimation with respect to the second training feature vector sequence.

The controller may continuously perform the forward estimation using the first training feature vector sequence, and may continuously perform the backward estimation using the second training feature vector sequence.

The controller may be configured to perform the forward estimation of the neural network by estimating a subsequent word to be connected to a first word included in the training data, and by estimating a current word based on a past word record in a sentence, and may be configured to perform the backward estimation by estimating a previous word connected to a second word included in the training data, and by estimating a current word based on a future word record in the sentence.

Based on the error value, a connection weight may be updated between artificial neurons included in the neural network.

The apparatus may also include a calculating processor configured to calculate bidirectional occurrence probabilities of a word sequence using the neural network, and configure the language model to estimate a word at a position of interest.

The first training feature vector sequence may be generated beginning in a forward direction of the word vector sequence, and the second training feature vector sequence may be generated beginning in a backward direction of the word vector sequence.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing functions and/or operations described is an example; however, the sequence of and/or operations is not limited to that set forth herein and may be changed as is known in the art, with the exception of functions and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Hereinafter, examples are described in detail with reference to the accompanying drawings. The following specific structural or functional descriptions are exemplary to merely describe the examples, and the scope of the examples is not limited to the descriptions provided in the present specification. Various changes and modifications can be made thereto by those of ordinary skill in the art. Like reference numerals in the drawings denote like elements, and a known function or configuration will be omitted herein.

It will be understood that when an element or layer is referred to as being "on" or "connected to" another element or layer, it can be directly on or connected to the other element or layer or through intervening elements or layers may be present. In contrast, when an element is referred to as being "directly on" or "directly connected to" another element or layer, there are no intervening elements or layers present. Like reference numerals refer to like elements throughout. As used herein, the term "and/or" includes any and all combinations of one or more of the associated listed items.

Figure 1A:
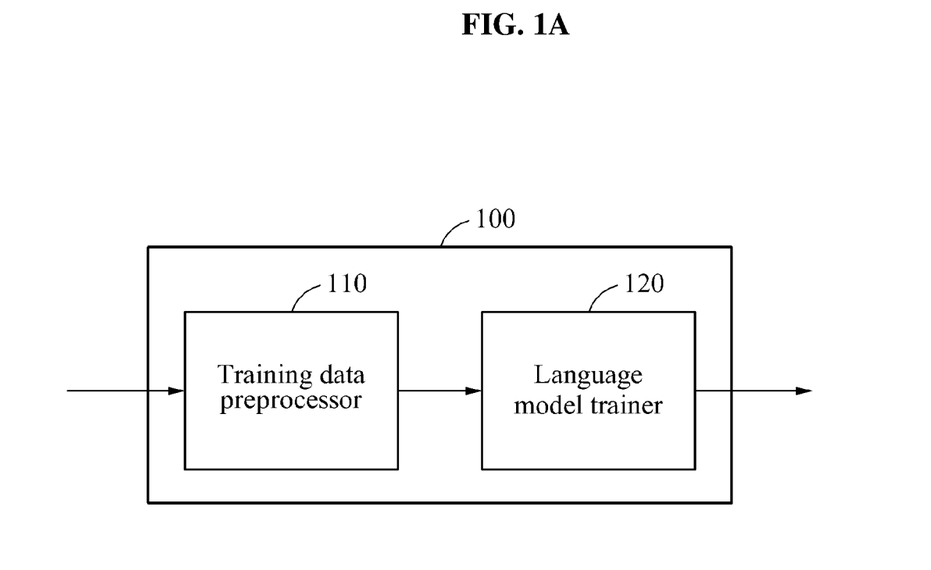
FIG. 1A is a block diagram illustrating an example of a configuration of an apparatus to train a language model, in accordance with an embodiment.

FIG. 1 is a block diagram illustrating an example of a configuration of an apparatus to train a language model, in accordance with an embodiment.

An apparatus 100 to train a language model trains a neural network based language model. The apparatus 100 to train the language model trains the language model through bidirectional estimation, and outputs the trained language model.

The language model estimates a recognition result corresponding to an input pattern based on a neural network. A recognition performance of the language model improves through a learning process. The language model is used to estimate words to be recognized with respect to successive speech data or handwriting data, for example, a text input. The language model is used for a natural language recognition system, for example, a system for speech recognition, handwriting recognition, dictation, interpretation, and translation. The language model includes a set, series, or group of words, and indicates a correspondence rate of each word to an input pattern as probability information.

The neural network is a recognition model implemented as hardware that simulates a computation capability of a biological system using a large number of artificial neurons connected through edges. The neural network executes processes to execute the simulation. The neural network performs a recognition action or a learning process of a human through the artificial neurons, and the artificial neurons are connected to each other through edges having connection weights. The connection weights are predetermined values of the edges, and may also be referred to as connection strengths. The artificial neurons may also be referred to as nodes.

Referring to FIG. 1A, the apparatus 100 to train a language model includes a training data preprocessor 110 and a language model trainer 120.

Training data to be used to train a language model is input into the training data preprocessor 110. Sequential data, for example, speech data or handwriting data, is used as the training data.

For example, the sequential data to be learned is input into the training data preprocessor 110 as training data. The training data preprocessor 110 segments the training data into sentence units. Words constituting each sentence unit are expressed in a form of vectors, and the training data preprocessor 110 converts the words included in a single sentence into a word vector sequence.

The training data preprocessor 110 extracts a feature from successive words in the training data, and converts the training data into the word vector sequence based on the extracted feature. For example, when the training data corresponds to speech data, the training data preprocessor 110 performs environmental adaptation, endpoint detection, echo cancellation, or noise removal, and extracts a feature vector to effectively express the digitalized speech data. The feature vector is extracted, for example, using a cepstrum extraction method that reflects a characteristic of a vocal tract and a characteristic of an excitation signal, or a Mel-frequency cepstrum coefficient (MFCC) corresponding to a cepstrum extraction method that reflects an auditory recognition process of a human.

The training data preprocessor 110 generates a first training feature vector sequence for forward estimation and a second training feature vector sequence for backward estimation from the word vector sequence. The first training feature vector sequence starts in a forward direction of the word vector sequence, and the second training feature vector sequence starts in a backward direction of the word vector sequence.

The language model trainer 120 trains the language model based on the first training feature vector sequence and the second training feature vector sequence. The first training feature vector sequence and the second training feature vector sequence are input sequentially into a language model over time. The language model trainer 120 performs forward estimation of the neural network configuring the language model with respect to the first training feature vector sequence, and performs backward estimation of the neural network with respect to the second training feature vector sequence. In accordance with an embodiment, the language model trainer 120 continuously performs the forward estimation with respect to the first training feature vector sequence, and, in accordance with an example, continuously performs the backward estimation with respect to the second training feature vector sequence.

The forward estimation of the neural network is a process of estimating a subsequent word to be connected to a first word included in the training data, and a process of estimating a current word based on a past word record in a given sentence. The backward estimation is a process of estimating a previous word connected to a second word included in the training data, and a process of estimating a current word based on a future word record in a given sentence.

For example, when the training data corresponds to a sentence "We are friends" and a current word input into the neural network is "are", the forward estimation estimates "are" based on a previous word "We", and the backward estimation estimates "are" based on a subsequent word "friends".

The language model is configured using a recurrent neural network of a bidirectional long short-term memory (BLSTM) structure capable of bidirectional estimation, or a recurrent neural network of another structure. The recurrent neural network is a neural network in which hidden nodes included in hidden layers are connected recurrently in different time periods. The recurrent neural network of the BLSTM structure will be described later with reference to FIG. 2.

The language model trainer 120 calculates bidirectional occurrence probabilities of a word sequence using a neural network capable of bidirectional estimation, for example, the recurrent neural network of the BLSTM structure. The language model trainer 120 configures the language model to estimate a word at a position of interest. For example, the language model trainer 120 trains the language model based on a forward context of the given sentence from left to right, and a backward context of the given sentence from right to left. Because the bidirectional contexts, the forward context and the backward context, are considered, a word is estimated more accurately and an effect of noise is reduced.

The language model trainer 120 calculates an error value between the training data and output data of the language model by integrating a result of the forward estimation with respect to the first training feature vector sequence and a result of the backward estimation with respect to the second training feature vector sequence. The language model trainer 120 updates a connection weight between artificial neurons included in the neural network based on the calculated error value.

The language model trainer 120 updates the connection weight between the artificial neurons, for example, using a back propagation through time (BPTT) scheme. The language model trainer 120 propagates the error value in a backward direction, starting from a convolution layer of the neural network in which the forward estimation result and the backward estimation result are integrated toward hidden layers and a data layer, and updates the connection weight between the artificial neurons to reduce the error value.

The language model trainer 120 defines an objective function to be used to measure optimal connection weights between currently set artificial neurons, continuously changes the connection weights based on a result of the objective function, and iteratively performs training. The objective function is, for example, an error function to be used to calculate an error between an actual output value and an expected value desired to be output from the neural network based on training data. The language model trainer 120 updates the connection weight to reduce a value of the error function.

Figure 1B:
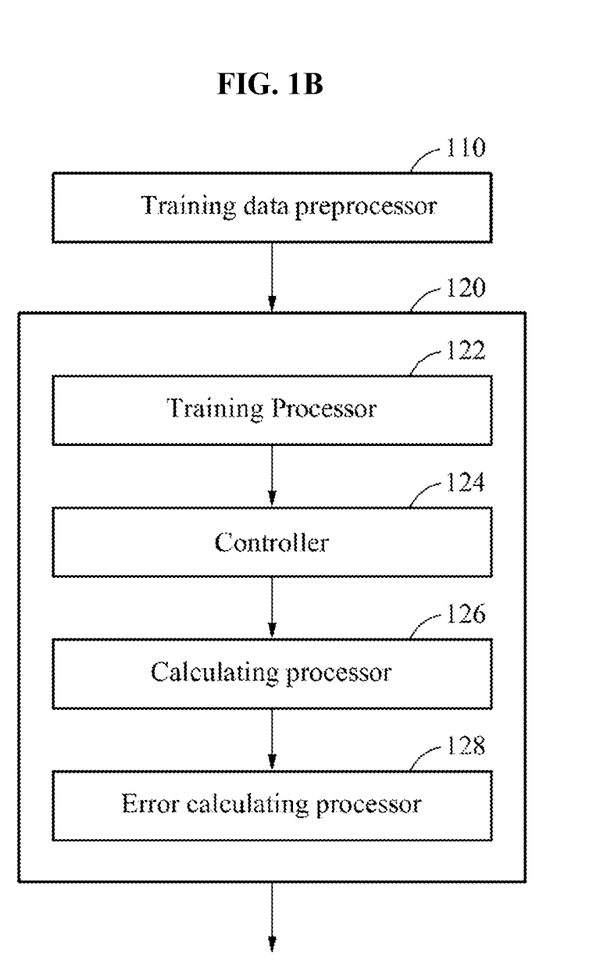
FIG. 1B is a block diagram illustrating an example of a configuration of the training data preprocessor and the language model trainer to train a language model, in accordance with an embodiment.

FIG. 1B is a block diagram illustrating an example of a configuration of the training data preprocessor 110 and the language model trainer 120 to train a language model, in accordance with an embodiment.

As previously explained, the training data preprocessor 110 generates the first training feature vector sequence beginning in a forward direction of the word vector sequence, and the second training feature vector sequence beginning in a backward direction of the word vector sequence.

The language model trainer 120 includes a training processor 122 configured to train the language model based on the first training feature vector sequence and the second training feature vector sequence generated at the training data preprocessor 110. The language model trainer 120 includes a controller 124 configured to perform forward estimation of the neural network with respect to the first training feature vector sequence, and perform backward estimation of the neural network with respect to the second training feature vector sequence. The controller 124 continuously performs the forward estimation with respect to the first training feature vector sequence, and continuously performs the backward estimation with respect to the second training feature vector sequence. The controller 124 performs the forward estimation of the neural network by estimating a subsequent word to be connected to a first word included in the training data, and by estimating a current word based on a past word record in a given sentence. The controller 124 performs the backward estimation by estimating a previous word connected to a second word included in the training data, and by estimating a current word based on a future word record in the sentence.

The language model trainer 120 also includes a calculating processor 126 configured to calculate bidirectional occurrence probabilities of a word sequence using a neural network capable of bidirectional estimation, and configures the language model to estimate a word at a position of interest. The language model trainer 120 also includes an error calculating processor 128 configured to calculate an error value between the training data and output data of the language model by integrating a result of the forward estimation with respect to the first training feature vector sequence and a result of the backward estimation with respect to the second training feature vector sequence. Based on the calculated error value, a connection weight is updated between artificial neurons included in the neural network. The language model is trained based on a forward context of the given sentence from left to right, and a backward context of the given sentence from right to left.

Figure 2:
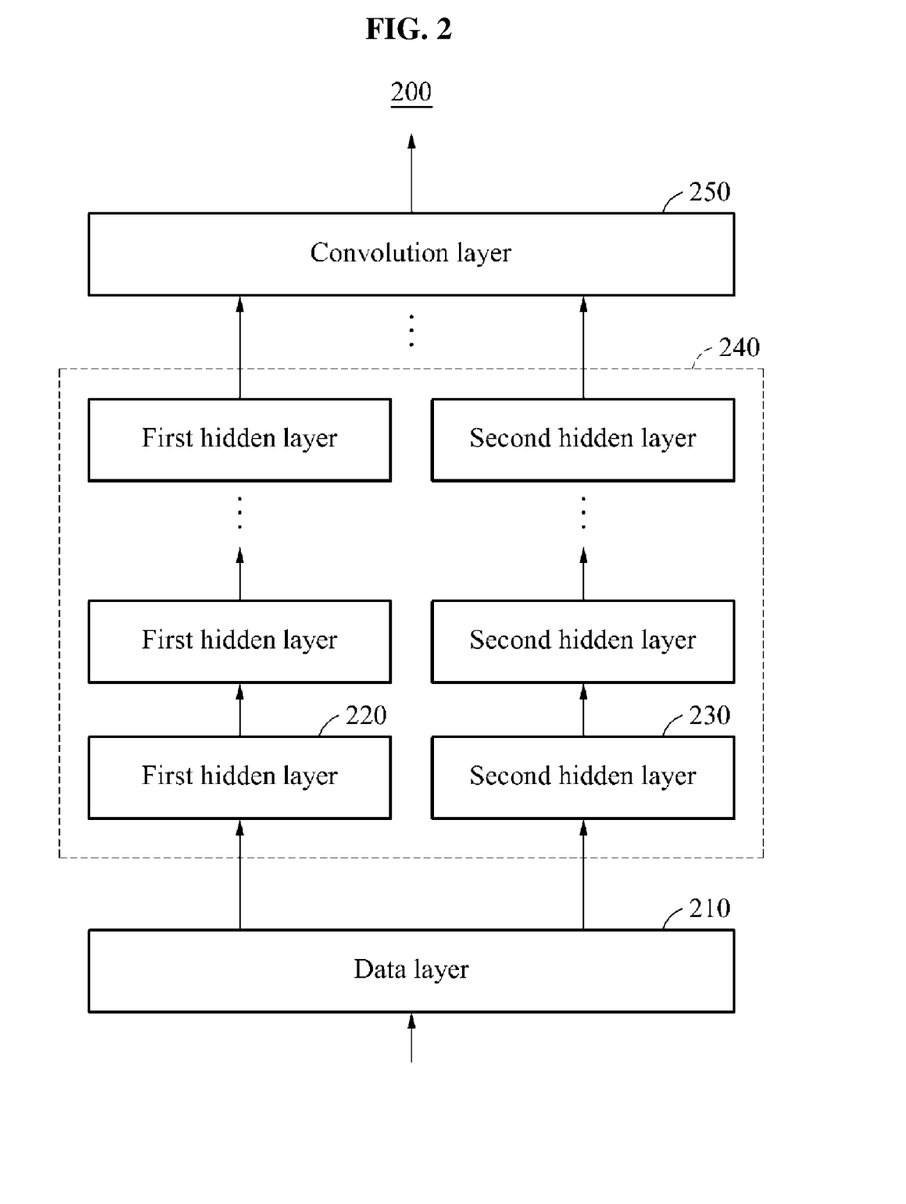
FIG. 2 is a block diagram illustrating an example of a structure of a neural network configuring a language model, in accordance with an embodiment.

FIG. 2 is a block diagram illustrating an example of a structure of a neural network configuring a language model, in accordance with an embodiment.

Referring to FIG. 2, a neural network 200 includes a data layer 210, hidden layers 240, and a convolution layer 250. The hidden layers 240 include a first hidden layer 220 and a second hidden layer 230. When the neural network 200 corresponds to a recurrent neural network of a BLSTM structure, the first hidden layer 220 and the second hidden layer 230 correspond to long short-term memory (LSTM) layers.

The recurrent neural network of the BLSTM structure includes memory blocks configured to maintain a value output in a previous time period until a subsequent time period. The memory blocks store a past history, and reflect the past history in a current stage. The recurrent neural network of the BLSTM structure inputs, stores, and outputs data input in time units using three gates, for example, an input gate, a forget gate, and an output gate, in a hidden layer.

A first training feature vector sequence for forward estimation and a second training feature vector sequence for backward estimation are input into the data layer 210. The first training feature vector sequence and the second training feature vector sequence are separately generated from feature vectors with respect to words included in training data. In accordance with an alternative configuration, the first training feature vector sequence and the second training feature vector sequence are generated simultaneously with the feature vectors with respect to words included in training data.

Forward probability information is calculated by performing forward estimation based on the first training feature vector sequence in the first hidden layer 220, and backward probability information is calculated by performing backward estimation based on the second training feature vector sequence in the second hidden layer 230.

A plurality of first hidden layers 220 and a plurality of second hidden layers 230 are provided, and the plurality of first hidden layers 220 and the plurality of second hidden layers 230 may have a hierarchical structure. A first hidden layer 220 is connected to an upper first hidden layer, and a second hidden layer 230 is connected to an upper second hidden layer.

Probability information calculated in the first hidden layer 220 and probability information calculated in the second hidden layer 230 is transmitted to the upper first hidden layer 220 and the upper second hidden layer 230, respectively. Probability information is re-calculated in the upper first hidden layer 220 and the upper second hidden layer 230 based on the received probability information. The forward estimation is performed through the first hidden layers 220, and the backward estimation is performed through the second hidden layers 230. In one configuration, the first hidden layers 220 and the second hidden layers 230 are structurally and functionally separate from each other. In an alternative configuration, the first hidden layers 220 and the second hidden layers 230 are structurally together, but functionally separate from each other. In a further alternative configuration, a single hidden layer is used to process the first and the second hidden layers.

In the convolution layer 250, the probability information deduced from the forward estimation and the probability information deduced from the backward estimation is integrated, and a final estimation result associated with an input word is generated based on a result of the integrating.

An apparatus for training a language model calculates an error value between the final estimation result generated in the convolution layer 250 and the input word, and update a connection weight between artificial neurons to reduce the error value.

Figure 3:
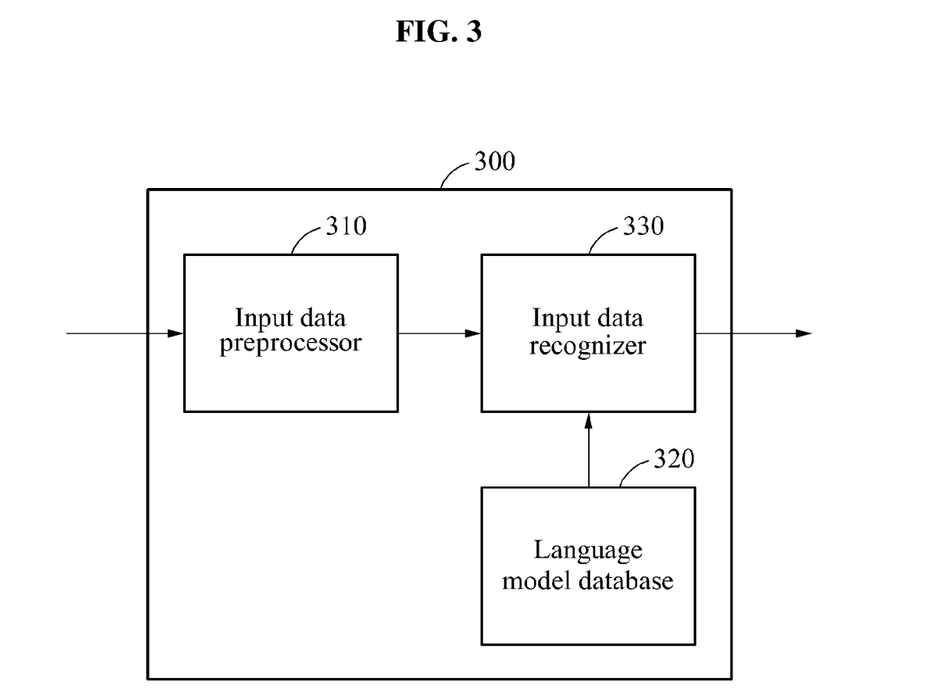
FIG. 3 is a block diagram illustrating an example of a configuration of an apparatus to recognize a language, in accordance with an embodiment.

FIG. 3 is a block diagram illustrating an example of a configuration of an apparatus to recognize a language, in accordance with an embodiment.

An apparatus 300 to recognize a language recognizes input data using a pre-trained language model, and outputs a recognition result. The apparatus 300 to recognize the language extracts a feature from the input data using the language model, and outputs a result that classifies and recognizes the input data by applying the extracted feature to the language model. For example, the apparatus 300 to recognize the language recognizes and outputs a sentence or a word corresponding to input speech data. The apparatus 300 to recognize language is used in fields of, for example, speech recognition and handwriting recognition, and is applicable to various devices/systems such as smart phones, tablet computers, desktop computers, navigation systems, display devices, wearable devices, security systems, and smart home systems, for example.

Referring to FIG. 3, the apparatus 300 to recognize the language includes an input data preprocessor 310, a language model database 320, and an input data recognizer 330.

The input data preprocessor 310 generates a first input feature vector sequence for forward estimation and a second input feature vector sequence for backward estimation from input data. Sequential data, for example, speech data or handwriting data, is input as the input data. Upon receipt of the input data, the input data preprocessor 310 extracts a relative variation with respect to a period of time as a feature from input speech data, and converts the extracted feature into a speech feature vector sequence. The input data preprocessor 310 generates a first input feature vector sequence starting in a forward direction of the speech feature vector sequence and a second input feature vector sequence starting in a backward direction of the speech feature vector sequence based on the speech feature vector sequence.

The input data recognizer 330 estimates a result of recognizing the input data by applying the first input feature vector sequence and the second input feature vector sequence to a neural network based on a language model. The first input feature vector sequence and the second input feature vector sequence may be sequentially input into the language model over time. In the alternative, the first input feature vector sequence and the second input feature vector sequence may be simultaneously input into the language model.

The language model is pre-trained by the process described with reference to FIGS. 1, 4, and 5, and stored in the language model database 320. A neural network configuring the language model is a recurrent neural network capable of bidirectional estimation, for example, forward estimation and backward estimation. The input data recognizer 330 continuously performs forward estimation of the neural network with respect to the first input feature vector sequence, and continuously performs backward estimation of the neural network with respect to the second input feature vector sequence. The forward estimation and the backward estimation are performed separately and independently. In the alternative, the forward estimation and the backward estimation are performed simultaneously.

The neural network configuring the language model includes first hidden layers configured to perform forward estimation and second hidden layers configured to perform backward estimation. The first hidden layers and the second hidden layers may be separate from each other or may be integrated. The input data recognizer 330 performs the forward estimation with respect to the first input feature vector sequence based on the first hidden layers, and performs the backward estimation with respect to the second input feature vector sequence based on the second hidden layers.

A forward estimation result associated with the first input feature vector sequence and a backward estimation result associated with the second input feature vector sequence are integrated by the language model, and a recognition result corresponding to the input data is determined based on a result of the integrating. In the configuration in which the forward estimation result and the backward estimation results are performed simultaneously and are integrated, the language model confirms that both results are integrated. The input data recognizer 330 outputs the recognition result determined by the language model through an interface device, for example, a display and a speaker.

Figure 4:
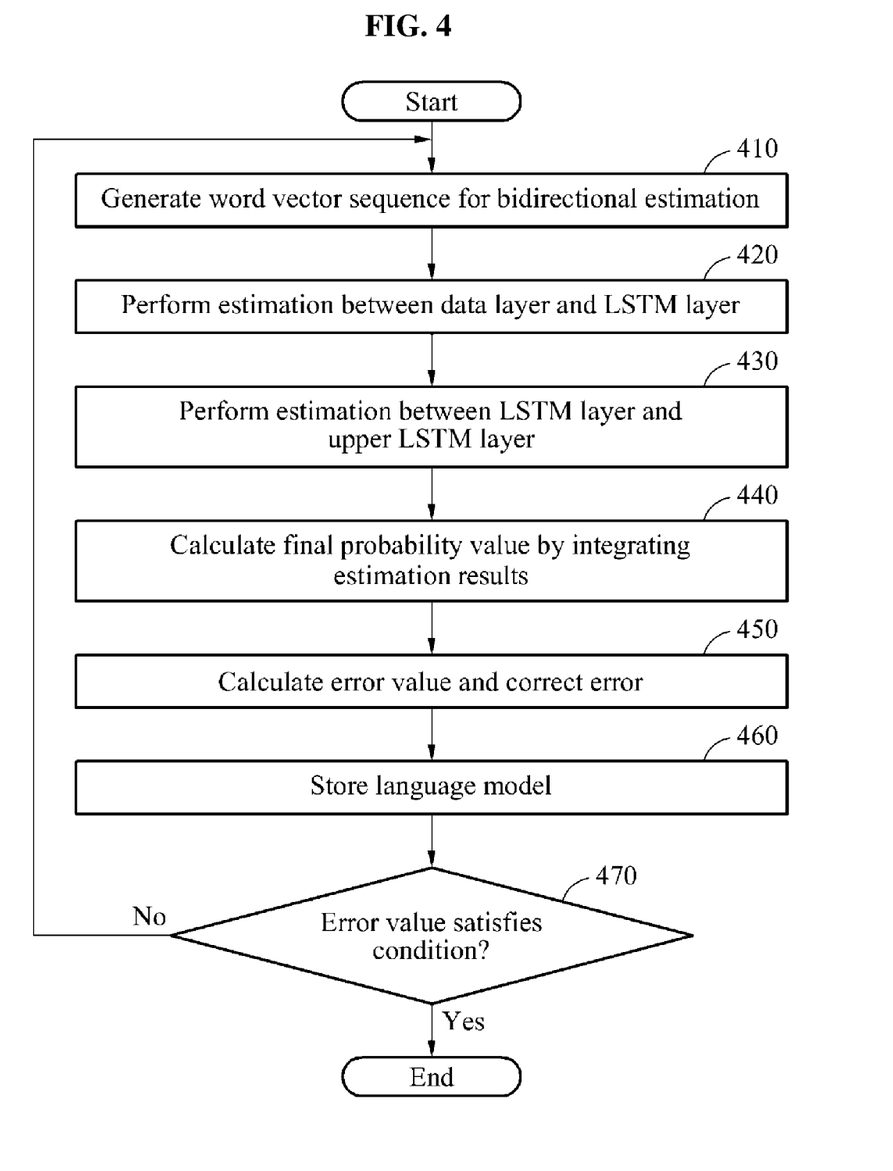
FIG. 4 is a flowchart illustrating an example of training a language model configured based on a recurrent neural network of a bidirectional long short-term memory (BLSTM) structure, in accordance with an embodiment.

FIG. 4 is a flowchart illustrating an example of training a language model configured based on a recurrent neural network of a BLSTM structure, in accordance with an embodiment.

Referring to FIG. 4, in operation 410, the apparatus 100 to train a language model generates a word vector sequence for bidirectional estimation. Training data includes a word sequence including successive words, and the apparatus 100 to train the language model generates the word vector sequence by converting a feature extracted from the word sequence into a form of a vector.

In accordance with an embodiment, the apparatus 100 to train a language model separately generates a first training feature vector sequence for forward estimation and a second training feature vector sequence for backward estimation from the word vector sequence. The apparatus 100 for training a language model generates the second training feature vector sequence by reconstructing the first training feature vector sequence in a reverse order.

In the forward estimation that estimates a word subsequent to a current input word, a special word or indicator flag or pointer is configured to indicate a start of a sentence is inserted at a beginning of the first training feature vector sequence. In the backward estimation that estimates a word previous to a current input word, a special word or indicator flag or pointer is configured to indicate indicating an end of a sentence may be inserted at a beginning of the second training feature vector sequence. In one configuration, for either the forward estimation or the backward estimation, the word, the flag, or pointer is a single character or compound characters pre-defined to be recognized as an indicator of a start of a sentence.

In operation 420, the apparatus 100 for training a language model performs estimation between a data layer and a long short-term memory (LSTM) layer. The first training feature vector sequence and the second training feature vector sequence generated in operation 410 is sequentially input into a data layer of a recurrent neural network of a bidirectional long short-term memory (BLSTM) structure in word units. The apparatus 100 to train a language model calculates a weighted sum of the first training feature vector sequence and the second training feature vector sequence based on an equation of the LSTM layer, which is known in the related art. The LSTM layer corresponds to a hidden layer in the recurrent neural network of the BLSTM structure.

When the recurrent neural network of the BLSTM structure includes hierarchical LSTM layers, the apparatus 100 to train the language model performs estimation between the LSTM layer and an upper LSTM layer, in operation 430.

The apparatus 100 to train the language model performs forward estimation of the upper LSTM layer based on, in one example, a result calculated by forward estimation of a previous LSTM layer, and performs backward estimation of the upper LSTM layer based on, in one example, a result calculated by backward estimation of the previous LSTM layer.

In operation 440, when the calculation in the LSTM layer is terminated, the apparatus 100 to train the language model calculates a probability value with respect to a final word by integrating a forward estimation result, associated with the first training feature vector sequence, and a backward estimation result, associated with the second training feature vector sequence.

In operation 450, the apparatus 100 to train the language model calculates an error value based on the probability value with respect to the final word, and corrects an error. The apparatus 100 to train the language model calculates the error value by comparing an input word to the final word using a supervised learning method, and corrects a connection weight between artificial neurons included in the LSTM layer by propagating the error value to a lower LSTM layer using a back propagation through time (BPTT) scheme.

In operation 460, the apparatus 100 to train the language model stores a language model trained by correcting the error. The apparatus 100 to train the language model stores connection weight information and state information related to artificial neurons constituting the recurrent neural network of the BLSTM structure.

In operation 470, the apparatus 100 to train the language model verifies whether the error value calculated in operation 450 satisfies a preset condition. When the error value satisfies the preset condition, the apparatus 100 to train the language model terminates training. Conversely, when the error value does not satisfy the preset condition, the apparatus 100 to train the language model re-executes operations 410 through 470.

Figure 5:
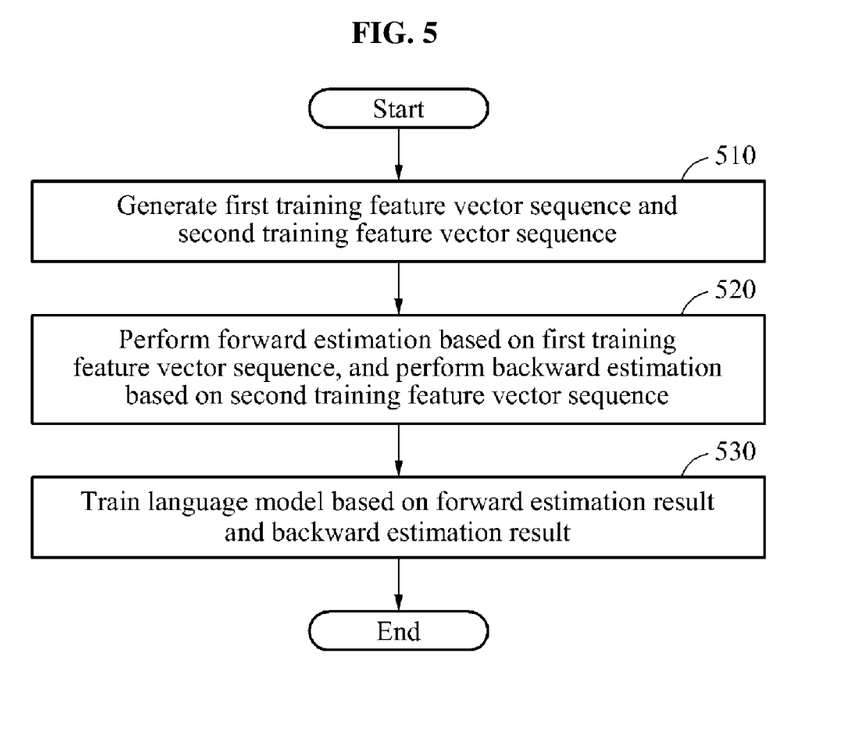
FIG. 5 is a flowchart illustrating an example of a method to train a language model, in accordance with an embodiment.

FIG. 5 is a flowchart illustrating an example of a method of training a language model, in accordance with an embodiment.

Referring to FIG. 5, in operation 510, the apparatus 100 for training a language model generates a first training feature vector sequence for forward estimation and a second training feature vector sequence for backward estimation from training data. The apparatus 100 to train the language model converts successive words constituting the training data into a word vector sequence, and generates the first training feature vector sequence starting in a forward direction of the word vector sequence and the second training feature vector sequence starting in a backward direction of the word vector sequence.

In operation 520, the apparatus 100 to train language model performs forward estimation of a neural network configuring a language model based on the first training feature vector sequence, and performs backward estimation of the neural network based on the second training feature vector sequence. The forward estimation with respect to the first training feature vector sequence and the backward estimation with respect to the second training feature vector sequence are performed separately. In an alternative configuration, the first training feature vector sequence and the backward estimation with respect to the second training feature vector sequence are performed concurrently.

In operation 530, the apparatus 100 to train the language model trains the language model based on a forward estimation result associated with the first training feature vector sequence and a backward estimation result associated with the second training feature vector sequence. The apparatus 100 to train the language model calculates an error value between the training data and output data of the neural network by integrating the forward estimation result and the backward estimation result, and updates a connection weight between artificial neurons to reduce the error value.

The descriptions provided with reference to FIGS. 1, 2, and 4 may be applicable to operations of FIG. 5 and thus, duplicated descriptions will be omitted for conciseness.

Figure 6:
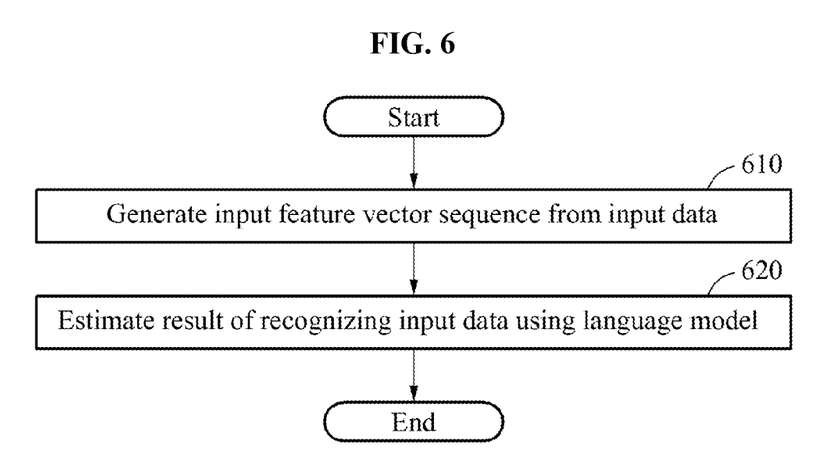
FIG. 6 is a flowchart illustrating an example of a method of recognizing a language, in accordance with an embodiment.

FIG. 6 is a flowchart illustrating an example of a method of recognizing a language, in accordance with an embodiment.

Referring to FIG. 6, in operation 610, the apparatus 300 to recognize a language generates an input feature vector sequence from input data. The apparatus 300 to recognize the language extracts a feature from the input data, and generates the input feature vector sequence based on the extracted feature. The apparatus 300 to recognize the language generates a first input feature vector sequence for forward estimation and a second input feature vector sequence for backward estimation based on the input feature vector sequence. In one embodiment, the first input feature vector sequence and the second input feature vector sequence are sequentially applied to a pre-trained language model over time.

In operation 620, the apparatus 300 to recognize language estimates a result of recognizing the input data using a neural network based language model. The apparatus 300 to recognize the language continuously performs forward estimation of a neural network configuring the language model based on the first input feature vector sequence, and continuously performs backward estimation of the neural network based on the second input feature vector sequence. The apparatus 300 to recognize the language estimates the result of recognizing the input data based on a forward estimation result associated with the first input feature vector sequence and a backward estimation result associated with the second input feature vector sequence.

The descriptions provided with reference to FIG. 3 may be applicable to operations of FIG. 6 and thus, duplicated descriptions will be omitted for conciseness.

The various trainers, layers, modules, elements, processors, and controllers described above are implemented using one or more hardware components.

A hardware component may be, for example, a physical device that physically performs one or more operations, but is not limited thereto. Examples of hardware components include resistors, capacitors, inductors, power supplies, frequency generators, operational amplifiers, power amplifiers, low-pass filters, high-pass filters, band-pass filters, analog-to-digital converters, digital-to-analog converters, processing devices, and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result.

In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 4-6. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

The methods illustrated in FIGS. 4-6 that perform the operations described herein with respect to FIGS. 4-6 are performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented method, comprising:
generating a first training feature data sequence and a second training feature data sequence from training data;
performing forward estimation of a neural network based on the first training feature data sequence;
performing backward estimation of the neural network based on the second training feature data sequence; and
training a language model based on a result of the forward estimation and a result of the backward estimation.

2. The method of claim 1, wherein the neural network comprises first hidden layers for the forward estimation and second hidden layers for the backward estimation, and
the first hidden layers are separate from the second hidden layers.

3. The method of claim 1, wherein the generating comprises:
converting the training data into a word sequence; and
generating the first training feature data sequence starting in a forward direction of the word sequence and the second training feature data sequence starting in a backward direction of the word sequence.

4. The method of claim 1, wherein the forward estimation comprises estimating a subsequent word to be connected to a first word included in the training data, and
the backward estimation comprises estimating a previous word connected to a second word included in the training data.

5. The method of claim 1, wherein the training comprises:
determining an error value between the training data and output data of the neural network based on the result of the forward estimation and the result of the backward estimation; and
updating a connection weight between artificial neurons included in the neural network based on the error value.

6. The method of claim 1, wherein the language model is configured based on a recurrent neural network of a bidirectional long short-term memory (BLSTM) structure.

7. The method of claim 6, wherein the recurrent neural network of the BLSTM structure comprises memory blocks configured to maintain a value output in a previous time period until a subsequent time period.

8. The method of claim 1, wherein the training data comprises sequential data comprising speech data, handwriting data, or a combination thereof.

9. A processor-implemented method, comprising:
generating a first input feature data sequence and a second input feature data sequence from input data; and
performing forward estimation of a neural network based on the first input feature data sequence and performing backward estimation of the neural network based on the second input feature data sequence to estimate a result of recognizing the input data.

10. The method of claim 9, wherein the neural network comprises first hidden layers for the forward estimation and second hidden layers for the backward estimation, and
the first hidden layers are separate from the second hidden layers.

11. The method of claim 9, wherein the estimating comprises
estimating the result of recognizing the input data based on a forward estimation result associated with the first input feature data sequence and a backward estimation result associated with the second input feature data sequence.

12. A non-transitory computer-readable storage medium comprising a program comprising instructions to cause a computer to perform the method of claim 1.

13. An apparatus, comprising:
a training data preprocessor configured to generate a first training feature data sequence and a second training feature data sequence from training data; and
a language model training processor configured to train a neural network based language model based on the first training feature data sequence and the second training feature data sequence, perform forward estimation of the neural network with respect to the first training feature data sequence, and perform backward estimation of the neural network with respect to the second training feature data sequence.

14. The apparatus of claim 13, wherein the neural network comprises first hidden layers for the forward estimation and second hidden layers for the backward estimation, and
the first hidden layers are separate from the second hidden layers.

15. The apparatus of claim 13, wherein the language model training processor is configured to train the language model based on a result of the forward estimation and a result of the backward estimation.

16. The apparatus of claim 13, wherein the language model training processor is configured to determine an error value between the training data and output data based on a result of the forward estimation and a result of the backward estimation, and update a connection weight between artificial neurons included in the neural network based on the error value.

17. The apparatus of claim 13, wherein the training data preprocessor is configured to convert the training data into a word sequence, and generate the first training feature data sequence starting in a forward direction of the word sequence and the second training feature data sequence starting in a backward direction of the word sequence.

18. An apparatus, comprising:
an input data preprocessor configured to generate a first input feature data sequence and a second input feature data sequence from input data; and
an input data recognizing processor configured to perform forward estimation of a neural network based on the first input feature data sequence, and perform backward estimation of the neural network based on the second input feature data sequence to estimate a result of recognizing the input data.

19. The apparatus of claim 18, wherein the first hidden layers are separate from the second hidden layers.

20. A non-transitory computer-readable storage medium comprising a program comprising instructions to cause a computer to perform the method of claim 9.

21. The method of claim 3, wherein the first training feature data sequence, the second training feature data sequence, and the word sequence are represented in a form of vectors.

* * * * *